W. A. Ives,
Hollow Auger.
No. 3,365. Reissued Apr. 13. 1869.
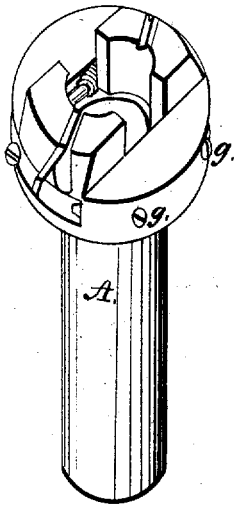
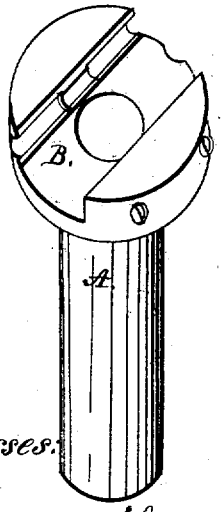
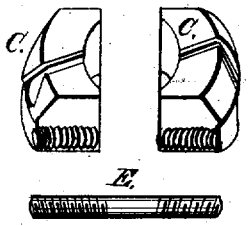
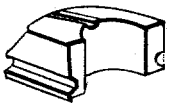
Witnesses:
Lockwood Sanford
Wm Heitch.
Inventor:
W. A. Ives
N. PETERS, PHOTO-LITHOGRAPHER, WASHINGTON, D. C.

United States Patent Office.

W. A. IVES, OF NEW HAVEN, CONNECTICUT.

*Letters Patent No.* 82,957, *dated October* 13, 1868; *reissue No.* 3,365, *dated April* 13, 1869.

IMPROVEMENT IN HOLLOW AUGERS.

The Schedule referred to in these Letters Patent and making part of the same.

*To all whom it may concern:*

Be it known that I, W. A. IVES, of New Haven, county of New Haven, and State of Connecticut, have invented a new and useful Improvement in Hollow Augers; and do hereby declare that the following is a general description thereof, reference being had to the accompanying drawings, making part of this specification, of which—

Figure 1 is a perspective view of my invention;

Figure 2, a view of the stock;

Figures 3 and 4, views of the die-holders and operating screw; and

Figure 5, an end view of one of the die-holders.

The nature of this invention consists in the construction of a hollow auger in such manner that the stock, which is circular, and having a hollow body, shall receive adjustable dies carrying knives or cutters in a slot on its face, for the purpose of making a circular tenon to fit in a corresponding circular mortise, for framing furniture, &c.

I take the circular stock A, of suitable size, for a five or six-quarter hollow auger. Across and through the centre of the head, I cut a slot, B, about half an inch deep, and of sufficient width for cutting a large size tenon. Into this slot, I fit two movable dies, or knife-holders C C, with grooves in their sides. Into one side of the slot B, I cut a right and left-hand screw, D. About half its diameter is let into the side of the slot B, and the other half works into a corresponding threaded recess in the groove of the knife-holder. This screw is held stationary near the centre of the slot by a collar, or projection *e*, on the stock. These knife-holders are kept in place, and firmly held when the machine is in use, by means of set-screws *f f*, which pass through the head of the stock A, opposite to the right and left screw D, the points of which fit into the grooves *g g* in the sides of the knife-holders.

The cutters may be laid upon the holders horizontally, or let into the side upon an angle, as desired.

These cutters, which are carried by the movable dies, are made to approach or recede from each other, by simply turning the screw D, and always upon the same angle, so that the shoulder of the tenon is always the same.

Having described my invention,

What I claim, and desire to secure by Letters Patent, is—

The circular stock A, having the slot B across its face, in combination with the screw D, adjustable dies, or knife-holders C C, and set-screws *f f*, when constructed and operated substantially as and for the purpose described and set forth.

In testimony whereof, I have hereunto set my signature, this 4th day of January, A. D. 1869.

W. A. IVES.

Witnesses:

WM. MOULTHROP,
M. E. ROBINSON.